(12) United States Patent
Chen et al.

(10) Patent No.: US 11,775,381 B2
(45) Date of Patent: Oct. 3, 2023

(54) REDUNDANCY METADATA SCHEMES FOR RAIN PROTECTION OF LARGE CODEWORDS

(71) Applicant: Micron Technology, Inc., Boise, ID (US)

(72) Inventors: Zhengang Chen, San Jose, CA (US); Sivagnanam Parthasarathy, Carlsbad, CA (US)

(73) Assignee: Micron Technology, Inc., Boise, ID (US)

( * ) Notice: Subject to any disclaimer, the term of this patent is extended or adjusted under 35 U.S.C. 154(b) by 8 days.

(21) Appl. No.: 17/477,859

(22) Filed: Sep. 17, 2021

(65) Prior Publication Data

US 2023/0086696 A1 Mar. 23, 2023

(51) Int. Cl.
*G06F 11/00* (2006.01)
*G06F 11/10* (2006.01)
*G06F 3/06* (2006.01)

(52) U.S. Cl.
CPC ........ *G06F 11/1004* (2013.01); *G06F 3/0619* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| RE48,448 E * | 2/2021 | Colgrove | G06F 11/3034 |
| 11,340,987 B1 * | 5/2022 | Gole | G06F 3/0619 |
| 2012/0233523 A1 * | 9/2012 | Krishnamoorthy | H03M 13/353 711/E12.008 |
| 2014/0192583 A1 * | 7/2014 | Rajan | G11C 7/10 365/63 |
| 2014/0281810 A1 * | 9/2014 | Gifford | G11C 29/52 714/764 |
| 2014/0380096 A1 * | 12/2014 | Dodson | G11C 29/42 714/16 |

(Continued)

OTHER PUBLICATIONS

PCT Notification of Transmittal Of The International Search Report And The Written Opinion Of The International Searching Authority for PCT Application No. PCT/US2022/44022, dated Jan. 12, 2023, 9 pages.

*Primary Examiner* — Mujtaba M Chaudry
(74) *Attorney, Agent, or Firm* — Lowenstein Sandler LLP

(57) ABSTRACT

A plurality of codewords are programmed to one or more memory pages of a memory sub-system. Each memory page of the memory sub-system is associated with a logical unit of a plurality of logical units of the memory sub-system and at least one of a plane of a plurality of planes of the memory sub-system or a block of a plurality of blocks of the memory sub-system. Each codeword of the plurality of codewords comprises host data and base parity bits. A plurality of additional parity bits are programmed to the one or more memory pages of the memory sub-system, wherein each additional parity bit of the plurality of additional parity bits is associated with a codeword of the plurality of standard codewords. A first set of redundancy metadata is generated corresponding to each of the additional parity bits. The first set of redundancy metadata is programmed to a memory page separate from any memory page storing the additional parity bits.

21 Claims, 6 Drawing Sheets

(56) References Cited

U.S. PATENT DOCUMENTS

| | | |
|---|---|---|
| 2017/0262332 A1 | 9/2017 | Barndt |
| 2020/0050512 A1 | 2/2020 | Basu |
| 2020/0201711 A1 | 6/2020 | Kim |
| 2020/0218611 A1 | 7/2020 | Cha |
| 2021/0173743 A1 | 6/2021 | Xie |

* cited by examiner

REDUNDANCY METADATA SCHEMES FOR RAIN PROTECTION OF LARGE CODEWORDS

TECHNICAL FIELD

Embodiments of the disclosure relate generally to memory sub-systems, and more specifically, relate to redundancy metadata schemes for RAIN protection of large codewords.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
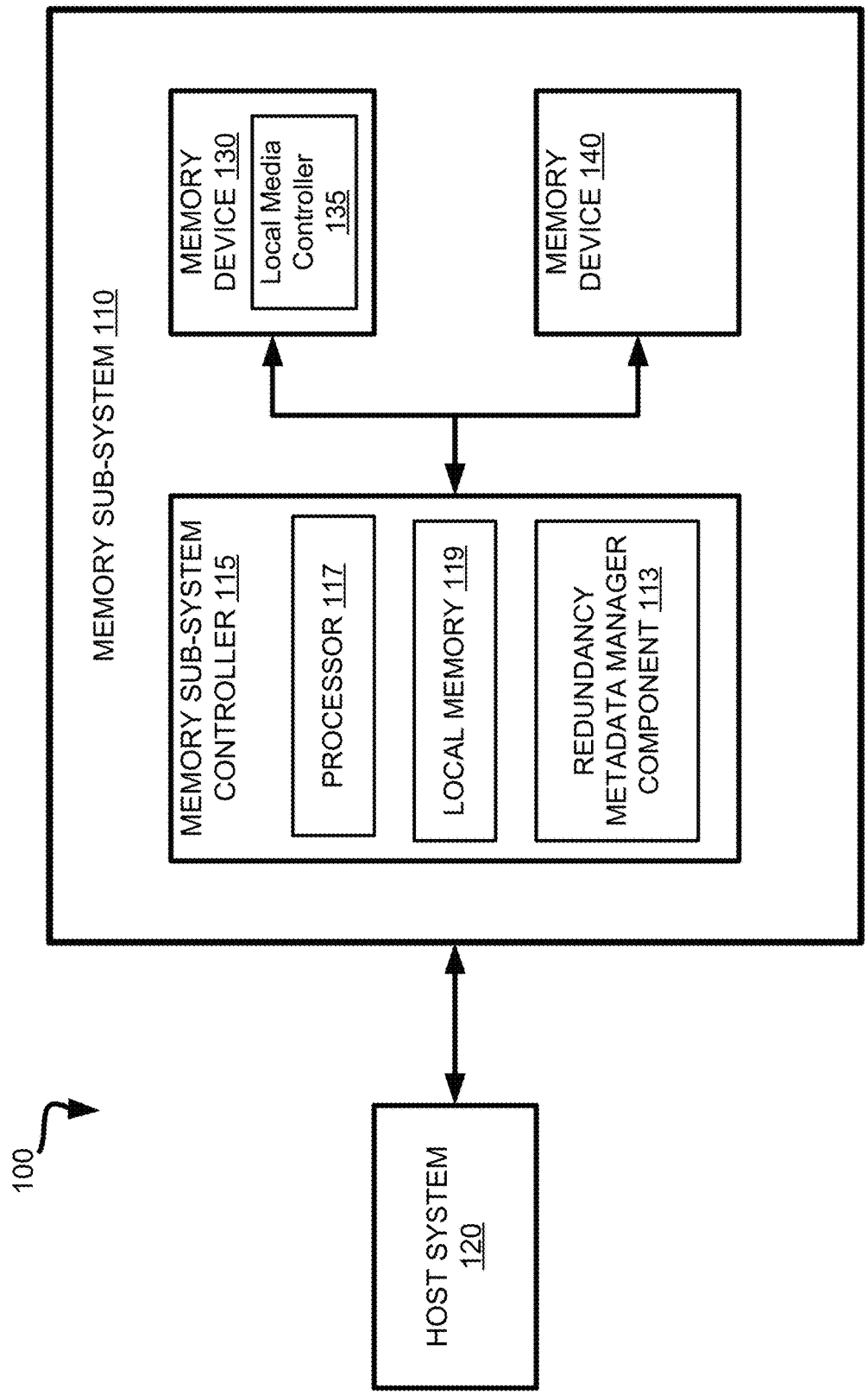
FIG. 1 illustrates an example computing system that includes a memory sub-system, in accordance with some embodiments of the present disclosure.

Aspects of the present disclosure are directed to redundancy metadata schemes for RAIN protection of large codewords. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information.

As described above, a die can contain one or more planes. A memory sub-system can use a striping scheme to treat various sets of data as units when performing data operations (e.g., write, read, erase, etc.). A die stripe refers to a collection of planes that are treated as one unit when writing, reading, or erasing data. A controller of a memory device (i.e., a memory sub-system controller, a memory device controller, etc.) can execute the same operation can carry out the same operation, in parallel, at each plane of a dice stripe. A block stripe is a collection of blocks, at least one from each plane of a die stripe, that are treated as a unit. The blocks in a block stripe can be associated with the same block identifier (e.g., block number) at each respective plane. A page stripe is a set of pages having the same page identifier (e.g., the same page number), across a block stripe, and treated as a unit.

A host system can initiate a memory access operation (e.g., a programming or write operation, a read operation, an erase operation, etc.) on a memory sub-system. For example, the host system can transmit a request to a memory sub-system controller, to program data to and/or read data from a memory device of the memory sub-system. Such data is referred to herein as "host data." The memory sub-system controller can execute one or more operations to access the host data in accordance with request. Host data can be encoded using error-correcting code (ECC)) to correct data errors that can occur during transmission or storage. In particular, the host data can be encoded using redundancy metadata (e.g., parity data such as one or more parity bits) to form a codeword. The parity data allows the memory sub-system controller to detect a number of errors that may occur anywhere in the host data, and often to correct these errors without retransmission.

A rate adaptive ECC is an error correction code that can protect host data with multiple tiers of parity data. Each tier is encodable and decodable, and each tier functions as an ECC with a different code rate. A first tier ECC parity is a subset of a second tier ECC parity, a first tier parity and a second tier parity are a subset of third tier parity, and so on. For example, a first tier ECC parity can be referred to as a standard codeword that includes the host data and a first parity (hereafter "base parity"), a second tier ECC parity can be referred to as a large codeword that includes the standard codeword and a second parity (hereafter "additional parity"), and so forth. As the tier number increases, the parity size increases, the code rate decreases, and the ECC protection becomes stronger. The first tier parity can be used for correcting errors due to relatively small granularity failures, the second tier parity can be used for correcting larger granularity failures, and so forth. In some cases of data corruption, only the additional parity for higher tier ECC needs to be transmitted to recover the data, thus saving channel bandwidth.

In some systems, large codewords (second tier ECC parity) can be split between multiple pages. In particular, a standard codeword can be programmed to a quarter of a page, thus four standard codewords fit in a single memory page. For example, for 4 KB codeword and 16 KB page, the memory subsystem controller can store four codewords per memory page. The additional parity of each large codeword can stored in a different page or plane. The additional parity can be read when standard ECC fails decoding, or at the same time the standard codeword is read, depending on workload, system performance, and/or power requirements.

As data is repeatedly accessed at a memory cell of a memory device, the memory cell can deteriorate and eventually become defective. For example, when a host system initiates too many memory access operations for host data stored at a memory device, the memory cells that store the host data, as well as the adjacent memory cells at the memory device, can become corrupted. In some instances, a memory access operation (e.g., a read operation, etc.) performed by a memory sub-system controller to access data at one or more memory pages of a plane of a memory device can fail. Such failure is referred to herein as a memory access failure.

A memory sub-system can support a redundancy mechanism to protect host data against memory access failures. For example, for a NAND type flash device, the memory sub-system can implement redundant array of independent NAND (RAIN) operations to provide redundancy for the data stored on the memory sub-system. When host data (or one or more codewords) is received from the host system to be programmed to a memory device of the memory sub-system, a memory sub-system controller can generate redundancy metadata based on one or more exclusive-or (XOR) operations with the received host data and can use the redundancy metadata to reconstruct or recalculate the host data in the event of a failure of a portion of the memory device that is storing host data. As an example, the memory sub-system controller can generate one or more RAIN standard codewords (redundancy metadata) based on an XOR operation applied to host data stored at a particular number of data locations of one or more logical units (LUNs) (e.g., a page, a block) of the memory sub-system. If a portion of a memory device storing the host data fails and the corresponding data is lost or corrupted, the memory sub-system controller can reconstruct the lost/corrupted data based on an XOR operation among the rest of the host data and the redundancy metadata.

For standard codewords, existing RAIN schemes allow a memory sub-system to protect host data against memory access failures. However, large codewords can be split between multiple planes. Currently, there are no schemes that enable recovery of the additional parity in the event that the page or plane storing said additional parities experiences failure.

Aspects of the present disclosure address the above and other deficiencies by providing redundancy metadata schemes for RAIN protection of large codewords. In particular, a portion of memory at a memory sub-system can be reserved to store different types of redundancy metadata generated for host data stored at other portions of memory at the memory sub-system. The reserved portions of memory can correspond to one or more specified memory devices that are configured to store redundancy metadata generated for host data stored at other memory devices of the memory sub-system. For example, a memory sub-system can include multiple stripes across multiple memory devices of the memory sub-system that are specified to store host data. One or more of the memory devices of the memory sub-system can be specified to store different types of redundancy metadata associated with host data residing at LUNs associated with each stripe across the multiple memory devices. The redundancy metadata can include additional parity data, RAIN redundancy metadata, and LUN redundancy metadata. The LUN redundancy metadata can be used to recover the additional parity data of each large codeword stored on the memory devices. The memory sub-system controller can generate LUN redundancy metadata based on one or more XOR operations with the additional parity data. For example, the memory sub-system controller can generate a LUN parity codeword by applying one or more XOR operations to each of the additional parity bits stored on each LUN.

In some instances, distinct portions (e.g., planes) of the memory devices can be specified to store specific type of redundancy metadata. As host data is programmed to a LUN, the memory sub-system controller can generate additional parity data for the respective stripe and can store the generated additional parity data at the specified portion of one or more memory devices. Furthermore, the memory sub-system controller can generate and store RAIN redundancy metadata and LUN redundancy metadata at other specified portions of one or more memory devices. In one embodiment, the additional parity data and the LUN redundancy metadata can be stored at different specified portions. By storing the different types of redundancy metadata associated with each stripe of the memory sub-system at a distinct portions of one or more specified memory devices, the memory sub-system controller can recover host data residing at respective LUNs associated with multiple stripes of the memory sub-system after a memory access failure at one or more of the multiple memory devices. For example, the memory sub-system controller can detect that a failure has occurred during a memory access operation (e.g., read operation, etc.) performed at a portion (e.g., at a memory page) of the memory sub-system. Responsive to detecting the memory access operation failure, the memory sub-system controller can determine whether the memory page contains 1) only host data, 2) host data and additional parity data, 3) host data, additional parity data, and RAIN redundancy metadata (e.g., a RAIN parity codeword), or 4) RAIN redundancy metadata and LUN redundancy metadata (e.g., a parity codeword). The host data can be encoded with a base parity data. Responsive to determining that the memory page contains only host data, the memory sub-system controller can recover the host data on the memory page using a series of XOR operations on the RAIN parity metadata and the remaining host data programmed to other portions of the memory devices. Responsive to determining that the memory page contains host data and additional parity data, the memory sub-system controller can recover the host data on the memory page using a series of XOR operations on the RAIN parity metadata and the remaining host data, and recover the additional parity data using the LUN parity data and remaining additional parity data programmed to other portions of the memory devices. Alternatively, in some embodiments, responsive to the memory sub-system controller failing to recover the host data using the base parity data, the memory sub-system controller can use the additional parity data to recover host data using the additional parity data and a series of XOR operations. Responsive to determining that the memory page contains host data, additional parity data, and RAIN parity metadata, the memory sub-system controller can recover the host data and additional parity metadata using the methods discussed above, and regenerate the RAIN parity metadata using the host data. Responsive to determining that the memory page contains RAIN parity data and LUN parity data, the memory sub-system controller can regenerate the RAIN parity metadata and the LUN parity data using the host data and additional parity data. By storing the RAIN parity data, LUN parity data, and additional parity data at specific locations on different memory devices, the memory sub-system controller can perform a data recovery process for the data items associated with any failed portion of a memory device. A data item refers to an atomic unit of data that is written to and/or read from a LUN of the memory sub-system. For example, a data item can correspond to a data block or to a key-value pair. Responsive to recovering the data items, the data items can be programmed to the same or a different memory page. In some embodiments, the LUN parity data and/or RAIN parity data can be encoded using a second tier ECC parity.

In an embodiment that include four LUNs, each LUN spanning across 6 planes (e.g., 24 memory pages), the LUN parity data and RAIN parity data can be stored on five of the memory pages. As such, advantages of the present disclosure include, but are not limited to, providing a host data recovery scheme that enables recovery of host data encoded using second tier ECC parity metadata while maximizing the amount of memory space available to store host data. By encoding host data using second tier ECC parity, a memory sub-system controller can detect and correct errors in host data. Further, RAIN redundancy metadata and LUN redundancy metadata can recover data items at LUNs of one or more memory devices of the memory sub-system after a memory access failure. Accordingly, large codewords can be protected in the event of memory device failure while a significant amount of space of the memory sub-system is made available to store host data. As a result, strong ECC protections are provided for host data while a significant amount of system resources are made available for other processes, which increases overall system efficiency and reduces overall system latency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell.

Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a redundancy metadata manager component 113 that can manage redundancy data generated for host data stored at one or more portions of a memory device 130, 140. In some embodiments, the memory sub-system controller 115 includes at least a portion of the redundancy metadata manager component 113. For example, the memory sub-system controller 115 can include a processor 117 (processing device) configured to execute instructions stored in local memory 119 for performing the operations described herein. In some embodiments, the redundancy metadata manager component 113 is part of the host system 120, an application, or an operating system.

Redundancy metadata manager component 113 can be configured to generate redundancy metadata for user data and/or for groups of memory pages at two or more logical memory units (LUNs). An LUN can be a group of memory pages across multiple planes, blocks and/or dies. A LUN can represent an individual segment of the memory device that can be written or erased in a single operation. Redundancy metadata refers to metadata (e.g., parity data) generated for a data item programmed to a portion of a memory device 130, 140 that can be used by memory sub-system controller 115 to recover the data item after a failed memory access operation (e.g., write operation, read operation, etc.) at the portion of the memory device 130, 140. In some embodiments, redundancy metadata manager component 113 (also referred to as component 113 herein) can calculate or re-construct the failed data item by performing a data recover operation (e.g., one or more exclusive OR (XOR) operations) based on the redundancy metadata for the data item and one or more other data items stored at the memory device 130, 140 (or another memory device 130, 140 of memory sub-system 110).

Component 113 can generate different types of redundancy metadata based on predetermined locations of stored data (e.g., stipes of host data across multiple planes of a LUN, location of data within each memory page in each plane and/or LUN (first quarter page of a memory page, second quarter page of a memory page, and so forth), etc.) or the type of stored data (e.g., standard codewords, additional parity data, etc.). In some embodiments, the redundancy metadata can include first tier ECC parity data (e.g., base parity data), second tier ECC parity data (e.g., additional parity data), RAIN parity metadata, and LUN redundancy metadata. RAIN parity metadata can be used to recover host data (e.g., standard code words). LUN redundancy metadata can be used to recover the additional parity data for the stored host data.

Figure 2:
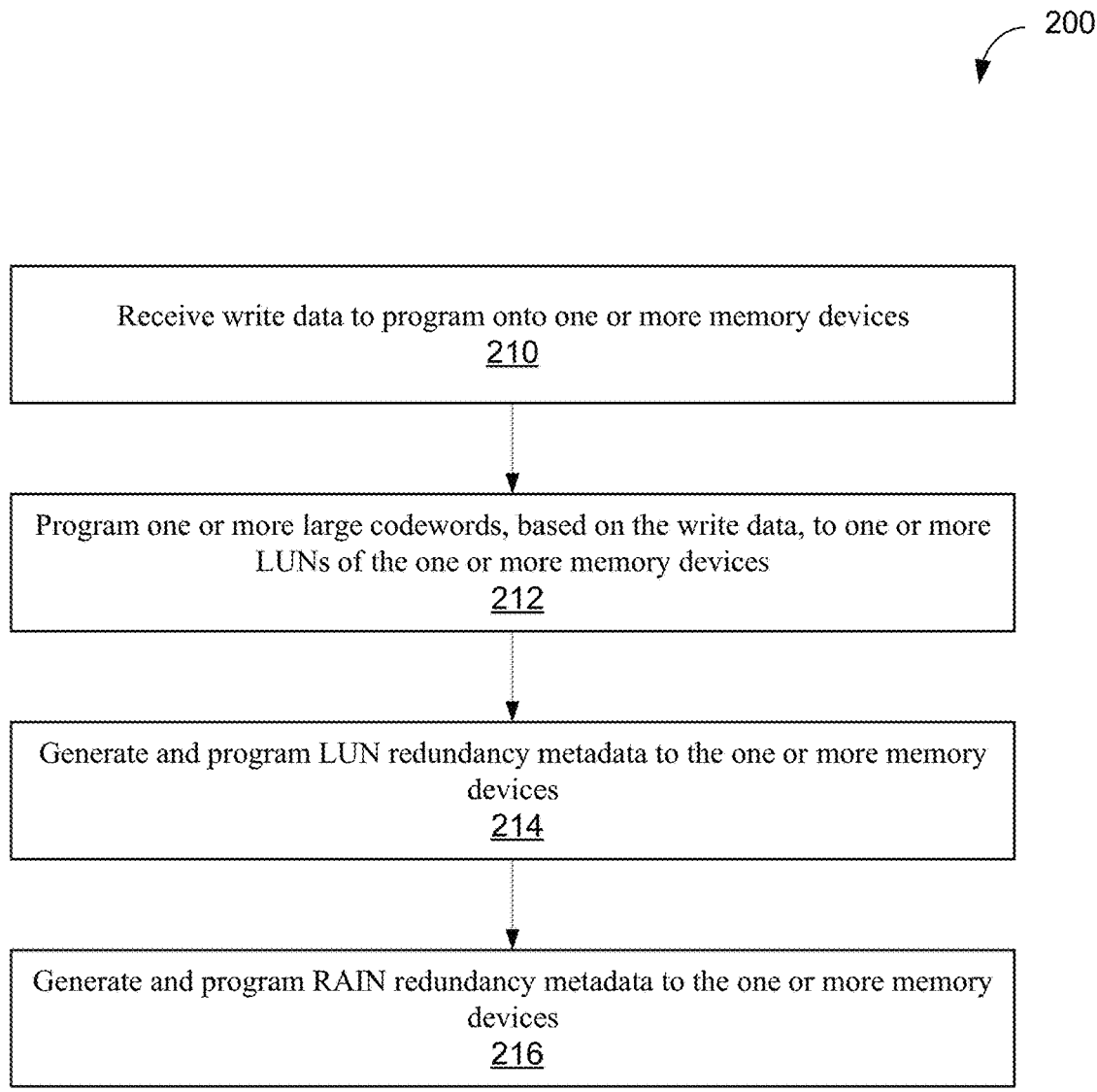
FIG. 2 is a flow diagram for generating redundancy metadata for a set of multi-plane LUNs, in accordance with some embodiments of the present disclosure.

FIG. 2 is a flow diagram of an example method 200 for generating redundancy metadata for a set of multi-plane LUNs, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the redundancy metadata manager component 113 of FIG. 1. In other or similar embodiments, one or more operations of method 200 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, processing logic receives write data to program onto one or more memory devices. In some embodiments, the write data can be received from host system 120. In some embodiments, the write data can include a set of large codewords. Each large codeword can be comprised of a standard codeword that includes host data and a base parity (first tier ECC parity), and an additional parity (second tier ECC parity).

In other embodiments, the write data includes un-encoded host data. Responsive to receiving un-encoded host data, processing logic can generate large codewords using the host data and parity data. In particular, the processing logic first generates standard codewords by generating base parity data based on one or more XOR operations with the received host data. By way of illustrative example, each standard codeword can be 4 KB is size and be programmable to a quarter size of a page. However, it is noted that embodiments of the present disclosure can be used with any sized pages. The processing logic then generates the large codewords by generating additional parity data based on one or more XOR operations with the standard codewords. The base parity data can be used to reconstruct or recalculate the corresponding host data in the event the host data becomes corrupted. The additional parity data, combined with the base parity data, can be used to reconstruct or recalculate the corresponding standard codeword in the event of a failure to read the standard codeword with stronger correction capability.

In some embodiments, the additional parity data can be encoded using a second tier ECC parity. For example, each standard codeword generated based on the additional parity data can be encoded to generate a large codeword. The additional parity data for each large codeword can be programmed to a designated section which will be described in greater detail with respect to FIG. 3. In some embodiments, only particular additional parity data can be encoded with a second tier ECC parity. For example, the additional parity data corresponding to host data based standard codewords stored on planes different than those storing the additional parity data can be encoded using second tier ECC parity, whereas the additional parity data corresponding to host data based standard codewords stored on the same plane as the additional parity data correlates to a second tier ECC codeword in the same plane. In the event of failure of a plane storing a standard codeword where a different plane stores the corresponding additional parity data, the additional parity data may enhance (e.g., speed up) recovery of the failed standard codeword. However, in the event of failure of a plane storing a standard codeword as well as the corresponding additional parity data, a second tier ECC parity of the additional parity is not necessary because other recover methods are used to recover the standard codeword and its corresponding additional parity data.

At block 212, processing logic programs the large codewords to one or more LUNs of the one or more memory devices. In particular, each LUN can correspond to a stripe of memory pages across multiple planes, blocks and/or die at a memory device 130, 140 of memory sub-system 110. By way of illustrative example, multiple LUNs of memory pages that span across multiple planes will be discussed hereafter. In each LUN, certain sections of memory pages can be designated for storing specific types of data (e.g., user data, encoded data, different types of redundancy data (additional parity data, RAIN parity metadata, LUN parity metadata, etc.)). For each large codeword, the corresponding standard codeword can be programmed to the available pages of a LUN designated for standard codewords, and the additional parity of each strong codeword can be programmed to a designated section (e.g., designated quarter page) of the corresponding LUN. The designated sections which will be described in greater detail with respect to FIG. 3.

At block 214, processing logic generates and programs LUN redundancy metadata to the one or more memory devices. The LUN redundancy metadata can be used to recover the additional parity data (e.g., the additional parity) of one or more large codewords. In some embodiments, processing logic can generate LUN redundancy metadata based on one or more XOR operations with the additional parity data. For example, processing logic can apply one or more XOR operations to each of the additional parity bits stored on each LUN. The LUN redundancy metadata can be programmed to a designated section of a designated LUN, which will be described in greater detail with respect to FIG. 3. If a portion of a memory device storing the additional parity data fails and the corresponding data is lost or corrupted, processing logic can reconstruct the lost/corrupted data based on one or more XOR operations among the rest of the additional parity data and the LUN redundancy metadata.

At block 216, processing logic generates and programs RAIN redundancy metadata to the one or more memory devices. In particular, processing logic can generate a first set of RAIN redundancy metadata (e.g., a first RAIN codeword) by performing a redundancy metadata generation operation (e.g., an exclusive or (XOR) operation) based on the data items (e.g., standard codewords) stored at a particular section of each memory page. For example, processing logic can generate the first RAIN codeword by performing XOR operations based on the standard codewords stored at the first quarter page of each memory page. Processing logic can then generate a second RAIN codeword by performing XOR operations based on the standard codewords stored at the second quarter page of each memory page. Processing logic can then generate a third RAIN codeword by performing XOR operations based on the standard codewords stored at the third quarter page of each memory page. Processing logic can then generate a fourth RAIN codeword by performing XOR operations based on the standard codewords stored at the fourth quarter page of each memory page. Each RAIN codeword can be programmed to a designated section of a designated LUN, which will be described in greater detail with respect to FIG. 3.

In some embodiments, each RAIN codeword can be further encoded using a second tier ECC parity. For example, processing logic can perform one or more XOR operations on the additional parity data of the host data that composes a RAIN stripe to generate additional parity metadata (hereafter "additional RAIN parity") for each RAIN codeword. The additional RAIN parity data can be programmed to a designated section of a designated LUN, which will be described in greater detail with respect to FIG. 3.

Figure 3:
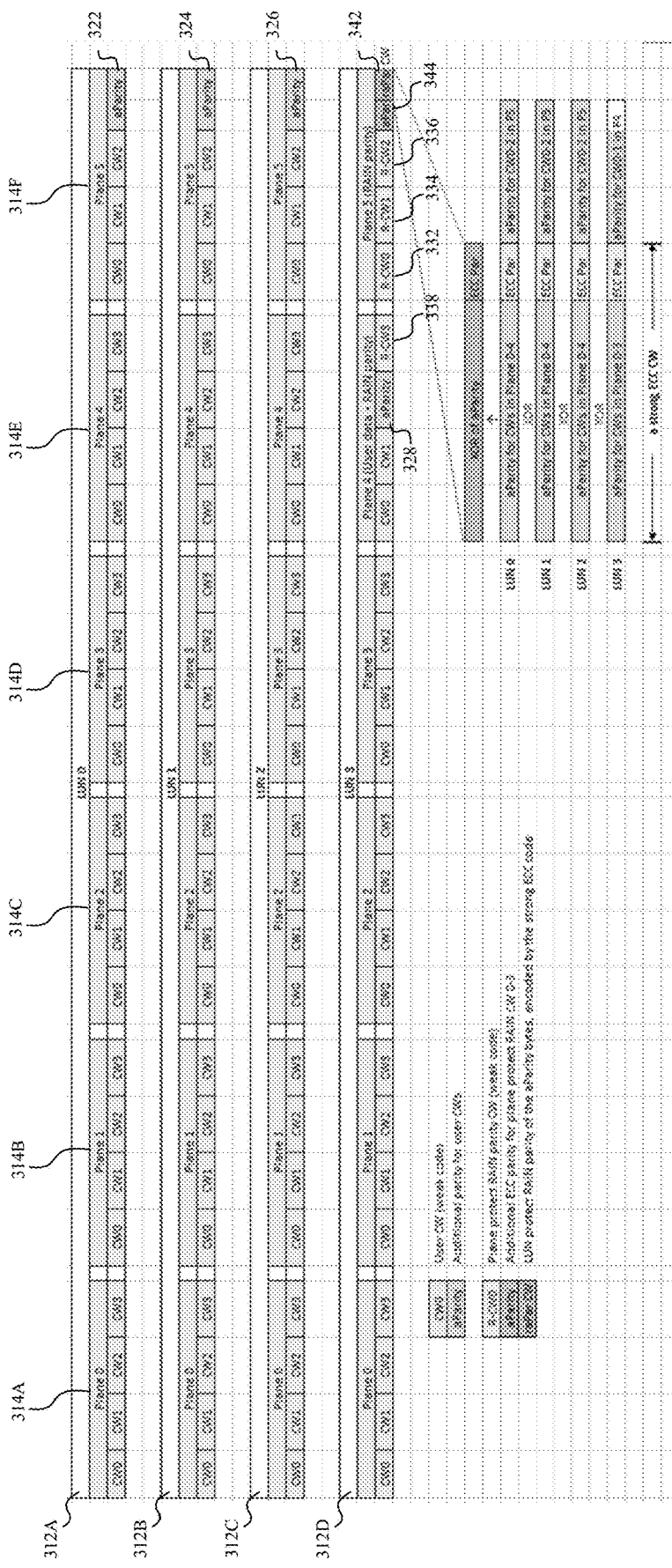
FIG. 3 is an illustration of example configuration for storing redundancy metadata in a set of LUNs, in accordance with some embodiments of the present disclosure.

FIG. 3 depicts an illustration of example configuration for storing redundancy metadata in a set of LUNs, in accordance with some embodiments of the present disclosure. As illustrated, LUNs 312A-D span across planes 314A-F, which can correspond to one or more memory devices 130, 140 described with respect to FIG. 1. It should be noted that although FIG. 3 depicts six planes (which can be connected to memory sub-system controller 115 (not shown)), embodiments of the present disclosure can be directed to any number of planes, blocks and/or dies connected to any number of memory sub-system controllers (e.g., one memory sub-system controller 115, two memory sub-system controllers 115, etc.).

As illustrated in FIG. 3, each LUN 312A-D includes a stripe of six memory pages (each memory page is split into four quarter pages) spanning across six planes (e.g., planes 314A-F). Each standard codeword can be stored to a quarter page. As illustrated, for LUNs 312A-C, the first twenty-five of the twenty-six quarter pages are configured to store a standard codeword. For LUN 312D, the first twenty of the twenty-six quarter pages are configured to store a standard codeword. The last quarter page of each of LUNs 312A-C is configured to store the additional parity data for the standard codewords stored in each respective LUN. For example, quarter page 322 can be configured to store the additional parity metadata for the twenty-three standard codewords stored on LUN 312A, quarter page 324 can be configured to store the additional parity data for the twenty-three standard codewords stored on LUN 312B, and quarter page 326 can be configured to store the additional parity data for the twenty-three standard codewords stored on LUN 312C. Regarding LUN 312D, the third quarter page (e.g., quarter page 328) of plane 314E of LUN 312D can be configured to store the additional parity data for the eighteen standard codewords stored on LUN 312D.

Each of the RAIN parity codewords 332, 334, 336, 338 can be stored on LUN 312D. In particular, the first quarter page of plane 314F of LUN 312D can be configured to store RAIN parity codeword 332 generated for the standard codewords stored at the first quarter page of each memory page, the second quarter page of plane 314F of LUN 312D can be configured to store RAIN parity codeword 334 generated for the standard codewords stored at the second quarter page of each memory page, the third quarter page of plane 314F of LUN 312D can be configured to store RAIN parity codeword 336 generated for the standard codewords stored at the third quarter page of each memory page, and the fourth quarter page of plane 314E of LUN 312D can be configured to store RAIN parity codeword 338 generated for the standard codewords stored at the fourth quarter page of each memory page.

The LUN redundancy metadata 342 can be stored on plane 314F of LUN 312D. In particular, a portion of the last quarter page of LUN 312D can store the LUN redundancy metadata 342. Further, another portion of the last quarter page of on plane 314F LUN 312D can be configured store the second tier ECC parity data 344 generated for each RAIN codeword (e.g., the additional RAIN parity). As will be explained in greater detail with respect to FIG. 5, by programming the different types of redundancy metadata (e.g., LUN parity data on a separate memory page from the additional parity metadata), the memory sub-system controller can recover host data residing at respective LUNs associated with multiple stripes of the memory sub-system after a memory access failure at one or more of the multiple memory devices.

Figure 4:
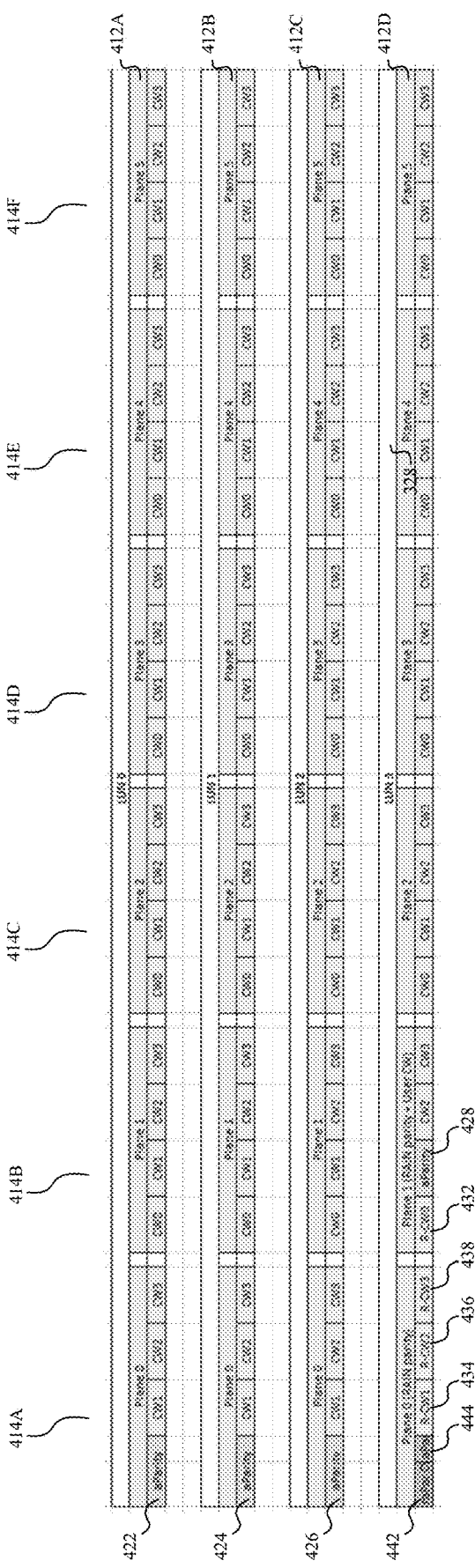
FIG. 4 is another illustration of example configuration for storing redundancy metadata in a set of LUNs, in accordance with some embodiments of the present disclosure.

FIG. 4 depicts another illustration of example configuration for storing redundancy metadata in a set of LUNs, in accordance with some embodiments of the present disclosure. As illustrated, LUNs 412A-D span across planes 414A-F, which can correspond to one or more memory devices 130, 140 described with respect to FIG. 1. It should be noted that although FIG. 4 depicts six planes (which can be connected to memory sub-system controller 115 (not shown)), embodiments of the present disclosure can be directed to any number of planes, blocks and/or dies connected to any number of memory sub-system controllers (e.g., one memory sub-system controller 115, two memory sub-system controllers 115, etc.). As illustrated, the redundancy metadata is stored in the first two planes (e.g., planes 414A-B) of LUN 412D, rather than the last two planes as illustrated in FIG. 3. In particular, quarter page 422 can be configured to store the additional parity metadata for the twenty-three standard codewords stored on LUN 412A, quarter page 424 can be configured to store the additional parity data for the twenty-three standard codewords stored on LUN 412B, and quarter page 426 can be configured to store the additional parity data for the twenty-three standard codewords stored on LUN 412C. Regarding LUN 412D, the second quarter page of plane 414B of LUN 412D (e.g., quarter page 428) can be configured to store the additional parity data for the eighteen standard codewords stored on LUN 412D. Each of the RAIN parity codewords 432, 434, 436, 438 can be stored on the first two planes (e.g., plane 414A-B) of LUN 412D. The LUN redundancy metadata 442 and the second tier ECC parity data 444 for each RAIN codeword can be stored on plane 414A of LUN 412D. FIG. 4 demonstrates that the redundancy metadata can be stored using different configurations, and, in the event of a memory page, plane, or block failure, any of the data items can be recovered using the remaining data items. In particular, by storing the RAIN parity data, LUN parity data, and additional parity data at specific locations on different memory devices, the memory sub-system controller can perform a data recovery process for the data items associated with any failed portion of a memory device.

Figure 5:
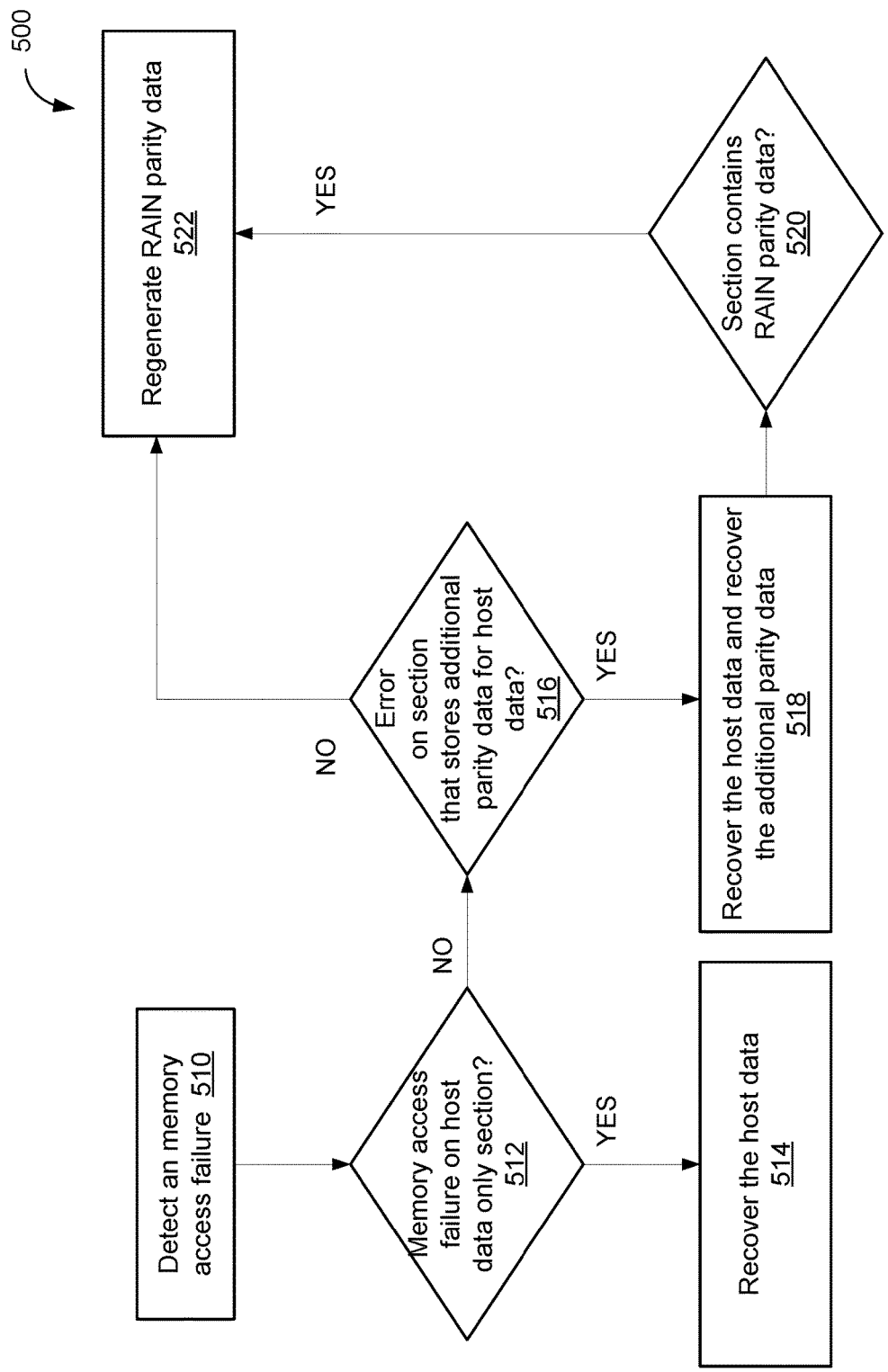
FIG. 5 is a flow diagram for recovering data using the redundancy metadata, in accordance with some embodiments of the present disclosure

FIG. 5 is a flow diagram of an example method 500 for recovering data using the redundancy metadata, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the redundancy metadata manager component 113 of FIG. 1. In other or similar embodiments, one or more operations of method 200 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, responsive to processing a read request, processing logic can determine that a memory access failure occurred. For example, the processing logic is unable to retrieve the requested data due to a defect, an error, data corruption etc.

At operation 512, processing logic determines whether the memory access failure occurred on a section (e.g., a memory page) of the memory device that stores host data only (e.g., planes 314A-314E of LUNs 312A-C or planes 314A-D of LUN 312D). For example, processing logic can determine whether the physical address associated with the read request correlates to a memory page of the memory device configured to store only host data. Responsive to determining that the read request is associated with a memory page of the memory device that stores host data only, processing logic proceeds to operation 514. Responsive to determining that the read request is not associated with a memory page of the memory device that stores host data only, processing logic proceeds to operation 516.

At operation 514, processing logic recovers the host data only memory page. For example, the processing logic can correct the host data and/or the RAIN parity codeword, in a corresponding stripe, using the additional parity data since the memory access failure does not affect any page, block, and/or plane that stores the additional parity data. In some embodiments, processing logic reconstructs the host data of the memory page using the remaining host data on the LUNs (e.g., LUNs 312A-D) and the RAIN redundancy metadata. For example, processing logic can use a RAIN algorithm (e.g., a series of XOR operations) on the RAIN parity data and the remaining host data based codewords (standard codewords or large codewords) to reconstruct the host data of the failed memory page. Specifically, the first RAIN codeword and the remaining standard codewords stored at the first quarter page of each memory page can be used to reconstruct the standard codeword that was stored at the first quarter page of the failed memory page, the second RAIN codeword and the remaining standard codewords stored at the second quarter page of each memory page can be used to reconstruct the standard codeword that was stored at the second quarter page of the failed memory page, the third RAIN codeword and the remaining standard codewords stored at the third quarter page of each memory page can be used to reconstruct the standard codeword that was stored at the third quarter page of the failed memory page, and the fourth RAIN codeword and the remaining standard codewords stored at the fourth quarter page of each memory page can be used to reconstruct the standard codeword that was stored at the fourth quarter page of the failed memory page.

At operation 516, processing logic determines whether the memory access failure occurred on a section that stores additional parity data for the host data (e.g., the read request is associated with a memory page of the memory device that stores additional parity data for the host data, such as plane 314F of LUNs 312A-C and plane 314E of LUN 312D). Responsive to determining that the memory access failure occurred on a section of the memory device that stores additional parity data for the host data, processing logic proceeds to operation 518. Responsive to determining that the memory access failure did not occur on a section of the memory device that stores additional parity data for the host data, processing logic proceeds to operation 522.

At operation 518, processing logic processing logic recovers the host data and additional parity data of the memory page. In particular, processing logic can recover the host data on the memory page using a series of XOR operations on the RAIN parity data and the remaining host data. Processing logic can recover the additional parity data using the LUN parity data and remaining additional parity data programmed to other memory pages associated with the LUNs.

At operation 520, processing logic determines whether the memory access failure occurred on a section that stores RAIN parity data (e.g., plane 314E of LUN 312D). Responsive to determining that the memory access failure occurred on a section that stores RAIN parity data, processing logic proceeds to operation 522. Responsive to determining that the memory access failure did not occur on a section that stores RAIN parity data, processing logic ends method 500.

At operation 520, processing logic regenerates the RAIN parity data and the LUN parity data using the host data and additional parity data. For example, processing logic can regenerate the RAIN parity codewords by applying one or more XOR operations on the host data (e.g., standard codewords). Processing logic can regenerate the LUN parity data by applying one or more XOR operations on the additional parity data.

Figure 6:
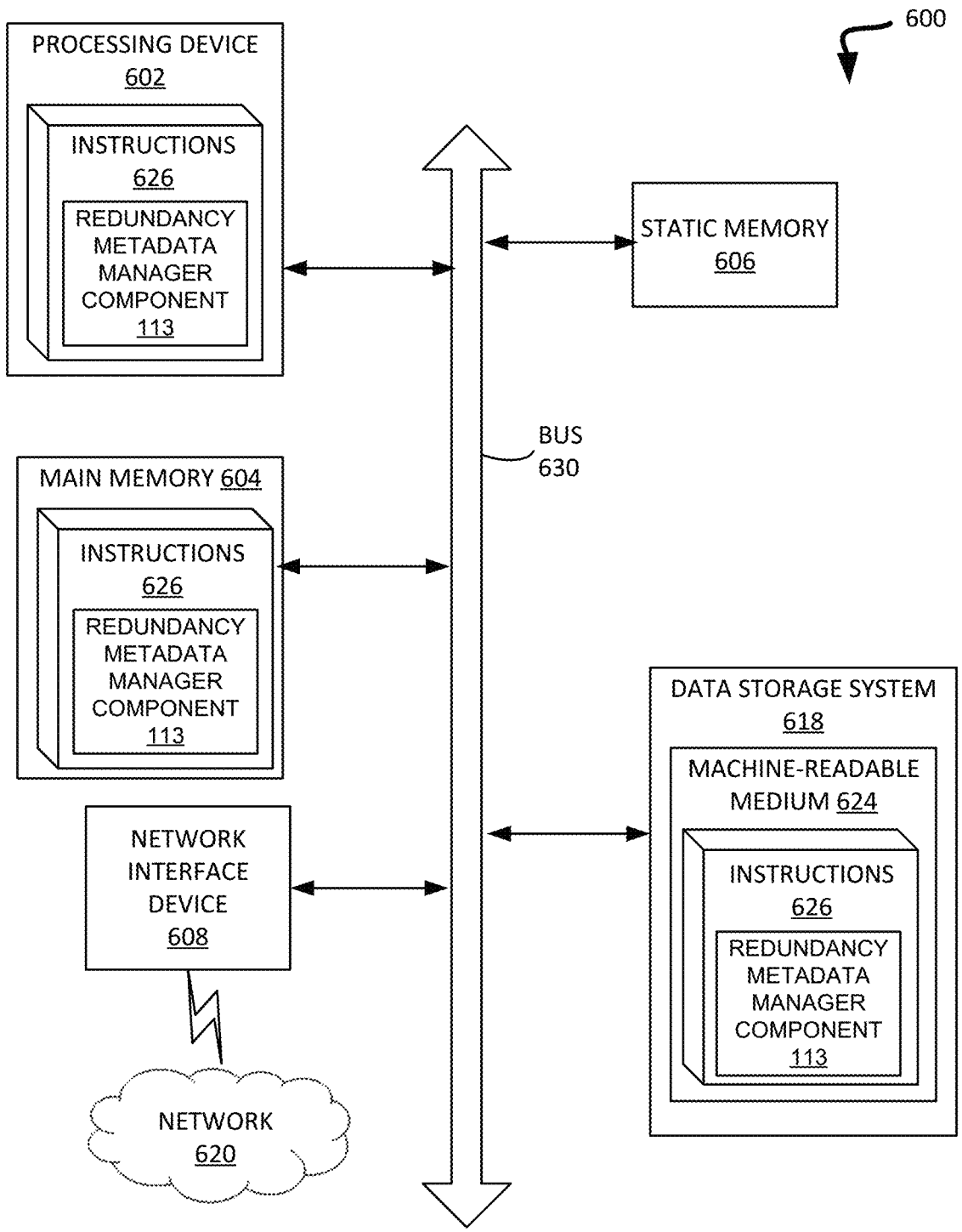
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the redundancy metadata manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 504 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 518 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a voltage bin boundary component (e.g., the redundancy metadata manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   programming a plurality of codewords to one or more memory pages of a memory sub-system, wherein each memory page of the memory sub-system is associated with a logical unit of a plurality of logical units of the memory sub-system and at least one of a plane of a plurality of planes of the memory sub-system or a block of a plurality of blocks of the memory sub-system, wherein each codeword of the plurality of codewords comprises host data and base parity bits;
   programming a plurality of additional parity bits to the one or more memory pages of the memory sub-system, wherein each additional parity bit of the plurality of additional parity bits is associated with a respective codeword of the plurality of codewords;
   generating a first set of redundancy metadata corresponding to each of the additional parity bits; and
   programming the first set of redundancy metadata to a memory page of the memory sub-system separate from any memory page storing the plurality of additional parity bits.

2. The method of claim 1, further comprising:
   generating a second set of redundancy metadata corresponding to a set of codewords; and
   programming the second set of redundancy metadata to the memory page of the memory sub-system storing the first set of redundancy metadata.

3. The method of claim 1, further comprising:
   generating second tier parity metadata for the first set of redundancy metadata; and
   programming the parity metadata to the memory page of the memory sub-system storing the first set of redundancy metadata.

4. The method of claim 1, wherein generating the first set of redundancy metadata comprises executing one or more exclusive or (XOR) operations based on the additional parity bits.

5. The method of claim 2, further comprising:
   generating parity metadata for the second set of redundancy metadata; and
   programming the parity metadata to the memory page of the memory sub-system storing the first set of redundancy metadata.

6. The method of claim 1, further comprising:
   determining that a read error occurred in response to receiving a read request for data items stored at a memory page of the memory sub-system;
   determining that the memory page that experienced the read error stored the first set of redundancy metadata;
   regenerating the first set of redundancy metadata; and
   storing the regenerated set of redundancy metadata to a different memory page of the memory sub-system.

7. The method of claim 2, further comprising:
   determining that a read error occurred in response to receiving a read request for data items stored at a memory page of the memory sub-system;
   determining that the memory page that experienced the read error stored the second set of redundancy metadata;
   regenerating the second set of redundancy metadata; and
   storing the regenerated set of redundancy metadata to a different memory page of the memory sub-system.

8. A non-transitory computer-readable storage medium comprising instructions that, when executed by a processing device, cause the processing device to perform operations comprising:
   programming a plurality of codewords to one or more memory pages of a memory sub-system, wherein each memory page of the memory sub-system is associated with a logical unit of a plurality of logical units of the memory sub-system and at least one of a plane of a plurality of planes of the memory sub-system or a block of a plurality of blocks of the memory sub-system, wherein each codeword of the plurality of codewords comprises host data and base parity bits;
   programming a plurality of additional parity bits to the one or more memory pages of the memory sub-system, wherein each additional parity bit of the plurality of additional parity bits is associated with a codeword of the plurality of codewords;
   generating a first set of redundancy metadata corresponding to each of the additional parity bits; and
   programming the first set of redundancy metadata to a memory page of the memory sub-system separate from any memory page storing the plurality of additional parity bits.

9. The non-transitory computer-readable storage medium of claim 8, wherein the operations further comprise:
   generating a second set of redundancy metadata corresponding to a set of codewords; and
   programming the second set of redundancy metadata to the memory page of the memory sub-system storing the first set of redundancy metadata.

10. The non-transitory computer-readable storage medium of claim 8, wherein the operations further comprise:
    generating second tier parity metadata for the first set of redundancy metadata; and
    programming the parity metadata to the memory page of the memory sub-system storing the first set of redundancy metadata.

11. The non-transitory computer-readable storage medium of claim 8, wherein generating the first set of redundancy metadata comprises executing one or more exclusive or (XOR) operations based on the additional parity bits.

12. The non-transitory computer-readable storage medium of claim 9, wherein the operations further comprise:
    generating parity metadata for the second set of redundancy metadata; and
    programming the parity metadata to the memory page of the memory sub-system storing the first set of redundancy metadata.

13. The non-transitory computer-readable storage medium of claim 8, wherein the operations further comprise:
    determining that a read error occurred in response to receiving a read request for data stored at a memory page of the memory sub-system;
    determining that the memory page that experienced the read error stored the first set of redundancy metadata;
    regenerating the first set of redundancy metadata; and
    storing the regenerated set of redundancy metadata to a different memory page of the memory sub-system.

14. The non-transitory computer-readable storage medium of claim 9, wherein the operations further comprise:
    determining that a read error occurred in response to receiving a read request for data items stored at a memory page of the memory sub-system;

determining that the memory page that experienced the read error stored the second set of redundancy metadata;

regenerating the second set of redundancy metadata; and storing the regenerated set of redundancy metadata to a different memory page of the memory sub-system.

15. A system comprising:

a memory sub-system; and a processing device, operatively coupled with the memory sub-system, to perform operations comprising:

programming a plurality of codewords to one or more memory pages of the memory sub-system, wherein each memory page of the memory sub-system is associated with a logical unit of a plurality of logical units of the memory sub-system and at least one of a plane of a plurality of planes of the memory sub-system or a block of a plurality of blocks of the memory sub-system, wherein each codeword of the plurality of codewords comprises host data and base parity bits;

programming a plurality of additional parity bits to the one or more memory pages of the memory sub-system, wherein each additional parity bit of the plurality of additional parity bits is associated with a respective codeword of the plurality of codewords;

generating a first set of redundancy metadata corresponding to each of the additional parity bits; and programming the first set of redundancy metadata to a memory page of the memory sub-system separate from any memory page storing the plurality of additional parity bits.

16. The system of claim 15, wherein the operations further comprise:

generating a second set of redundancy metadata corresponding to a set of codewords; and programming the second set of redundancy metadata to the memory page of the memory sub-system storing the first set of redundancy metadata.

17. The system of claim 15, wherein the operations further comprise:

generating second tier parity metadata for the first set of redundancy metadata; and programming the parity metadata to the memory page of the memory sub-system storing the first set of redundancy metadata.

18. The system of claim 15, wherein generating the first set of redundancy metadata comprises executing one or more exclusive or (XOR) operations based on the additional parity bits.

19. The system of claim 16, wherein the operations further comprise:

generating parity metadata for the second set of redundancy metadata; and programming the parity metadata to the memory page of the memory sub-system storing the first set of redundancy metadata.

20. The system of claim 15, wherein the operations further comprise:

determining that a read error occurred in response to receiving a read request for data items stored at a memory page of the memory sub-system;

determining that the memory page that experienced the read error stored the first set of redundancy metadata;

regenerating the first set of redundancy metadata; and storing the regenerated set of redundancy metadata to a different memory page of the memory sub-system.

21. The system of claim 16, wherein the operations further comprise:

determining that a read error occurred in response to receiving a read request for data items stored at a memory page of the memory sub-system;

determining that the memory page that experienced the read error stored the second set of redundancy metadata;

regenerating the second set of redundancy metadata; and storing the regenerated set of redundancy metadata to a different memory page of the memory sub-system.

* * * * *